J. F. BOYNTON.
APPARATUS FOR GENERATING CARBONIC ACID.
No. 3,546.
Reissued July 13, 1869.
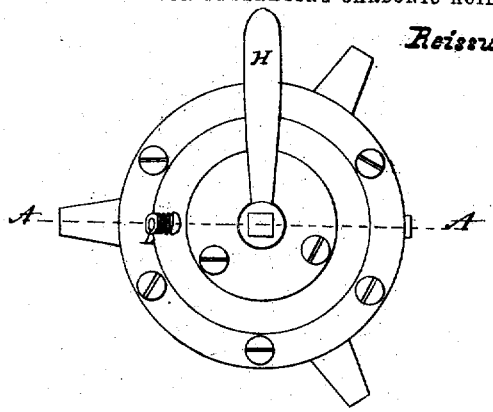
Fig. 2.
Fig. 3
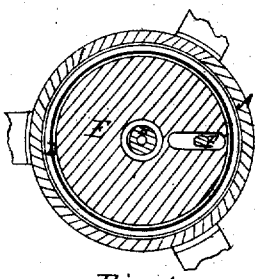
Fig. 4
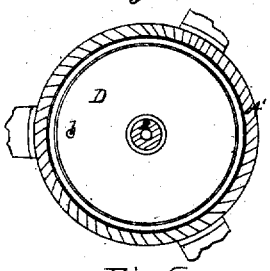
Fig. 5
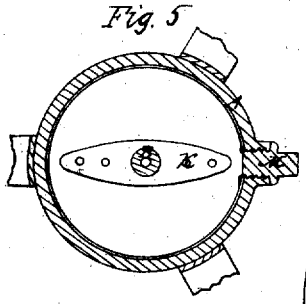
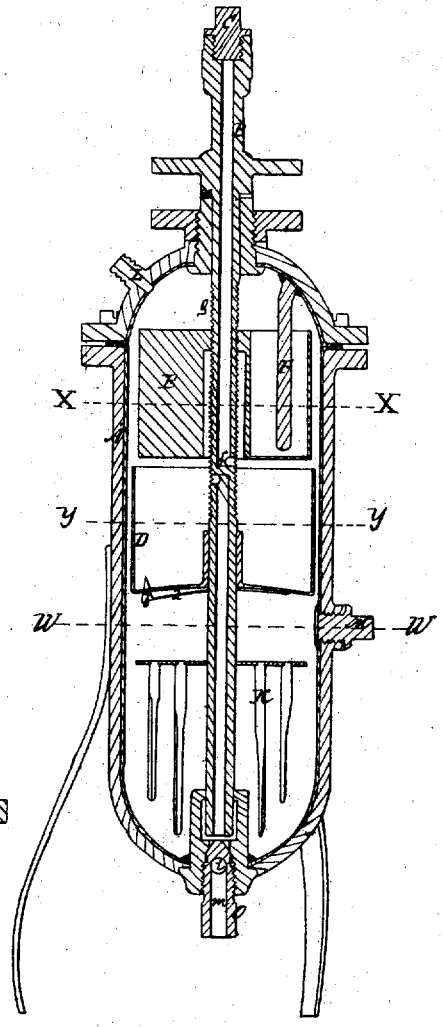

UNITED STATES PATENT OFFICE.

JOHN F. BOYNTON, OF SYRACUSE, NEW YORK.

IMPROVED APPARATUS FOR GENERATING CARBONIC-ACID GAS.

Specification forming part of Letters Patent No. 15,838, dated October 7, 1856; Reissue No. 3,546, dated July 13, 1869.

*To all whom it may concern:*

Be it known that I, JOHN F. BOYNTON, of Syracuse, in the county of Onondaga and State of New York, have invented certain new and useful Improvements in Generators for the Production of Carbonic-Acid Gas, and for charging soda-water, mineral water, and other liquids with gases under pressure, and for other purposes, of which the following is a full, clear, and exact description, reference being had to the annexed drawings, making part of this specification, in which—

Figure 1 is a plan of the generator; Fig. 2, a vertical section through the same upon the line A A of Fig. 1; Fig. 3, a section on the line X X of Fig. 2; Fig. 4, a section on Y Y of Fig. 2, and Fig. 5 a section on W W of Fig. 2.

My invention has for its object to enable me to deliver the sulphuric or other acid to the soda or other chemical in the body of the generator in such quantities and at such intervals of time as may be required, and without the employment of a separate vessel outside of the generator to contain the acid.

Heretofore the acid has been placed within a separate vessel communicating with the generator, and requiring to be made of equal strength therewith, thus materially adding to its cost.

In my improved apparatus the acid is contained in a vessel within the generator, from which it is measured with great exactness, and in such quantities as may be required, or all thrown down at once. By delivering it at proper intervals and in measured quantities the pressure in the apparatus may be maintained at a uniform standard as the contents are withdrawn. By placing the acid-chamber within the generator I also save an amount of gas varying with the capacity of the acid-chamber and the pressure of the gas within the apparatus; for, when the acid-chamber is on the outside of the generator and is emptied of its acid, the space becomes filled with compressed gas in the place of the uncompressible acid. Now, when the acid-chamber is to be filled anew, all the gas contained therein is lost, and if the capacity of said chamber is one cubic foot, and the pressure in the apparatus amounts to ten atmospheres, of course ten cubic feet of gas will be lost; but when the acid-chamber is within the generator, and the acid is displaced by a solid plunger, the plunger takes the place of the acid, while the acid merely overflows the chamber and falls in the generator below.

To enable others skilled in the art to understand my invention, I will proceed to describe the manner in which I have carried it out.

In the accompanying drawings, A is the body of the generator, made of metal or other suitable material. Through the center of the generator passes down the hollow tube B, which performs the treble purpose of sustaining and operating the stirrer, carrying the vessel which contains the acid, and sustaining and operating the plunger by which the acid is measured and delivered to the solution or chemicals beneath. It is also through this tube that the machine is fed with acid, which is poured in at the upper end of the tube, and flows from the side passage *f* into the vessel D. The joint at *x* is packed, and the extremity of the tube is closed with a screw-plug, C, and its interior lined with a metal not subject to attack from the acid. The acid-receptacle D is attached to the tube B, and is made of lead or other material capable of resisting the attack of acid. On the bottom of said vessel is a drip-valve, *b*, which is closed by a spring, *d*, and is opened by pressure upon its point, for a purpose which will be presently explained. The spring is made of or coated with precious metals or other non-corrosive material to withstand the action of the acid. Directly above the vessel D is the plunger E, which may be made of lead and filled with plaster or other suitable material. It is prevented from rotating by the pin F attached to the interior of the generator, and is connected with the tube B by the screw *g* in such a manner that, as the tube is turned by the handle H, the plunger rises and falls. When it descends into the vessel D the acid is displaced from the latter, the quantity being always proportionate to the number of turns given to the handle. When the plunger reaches the bottom of the vessel it opens the valve *b*, and the acid which still remains between the plunger and the vessel escapes.

It is evident that there are other methods by means of which the acid may be allowed to escape from its receptacle, which will be equivalent to the one above described. For instance, the plunger, as it descends, may be made to open a series of valves along the side of the vessel D, each valve permitting a given quantity of acid to escape; or the vessel may be tipped so as to discharge or partially discharge its contents; and in place of moving the plunger it may be made stationary, the acid-vessel being made to rise upon it. These methods are, obviously, but modifications of the device represented in the drawings, and need not be further described.

In order to agitate and mix the acid with the liquid or chemicals below, a stirrer, K, is attached to the tube B, and turns with it. The carbonated salts and water are introduced through an aperture which is closed by a plug, M, and the gas is withdrawn through a pipe, L, and conducted to any desired place.

In the bottom of the generator is a hollow screw-plug, O, with an aperture, *i*, near its upper end. The end of said plug is conical, and forms a bearing for the end of the tube B; but the principal object of said plug is to form an escape-cock, by means of which the liquid contents of the generator may be discharged when desired. The outer end of the plug may be attached to the draft-tube of a soda-fountain, and solutions of tartaric acid and carbonate of soda used to charge the generator; or the plug may be connected with tubing to convey the charged water to any other place. The conical end of the plug is made to press against a seat formed around the opening in the generator and act as a valve. When the said plug is loosened the end is removed from the opening, and the contents pass out through the passage *i* and hollow portion *m*.

To put the above-described apparatus in operation, the carbonate of soda or other suitable salt, with or without water sufficient for crystallization, is introduced through the opening M, and the acid introduced through the tube B into the vessel D. After properly closing the said opening and tube the handle is turned so as to cause the plunger to descend and displace the acid, and cause it to flow over into the solution beneath. When the plunger reaches the bottom of the vessel D it opens the drip-valve and allows the acid that still remains in the vessel to escape.

It is manifest that my invention is not only applicable to the purpose of charging soda or mineral water with gas, but may be used in all cases where it is desirable to charge water or other liquids with gases under pressure, and eject the same by the expansive force of of the gas, and is also applicable to the manufacture of other gases than carbonic acid, such as chlorine, hydrogen, &c., by merely changing the materials used for charging.

Having thus described my invention, what I claim, and desire to secure by Letters Patent is—

1. An apparatus for generating carbonic-acid or other gas having the acid-chamber suspended within the generator and operated from without, substantially as and for the purposes herein described.

2. An acid-chamber so constructed within the generator that the acid may be delivered to the solution or chemicals contained therein in measured quantities and at desired intervals.

3. The method of operating the plunger E or acid-chamber D by means of a rod or tube, B, as herein described.

4. The hollow tube B, carrying the acid-chamber D and plunger E, for filling the acid-chamber, as herein described.

5. The stirrer K attached to said tube, substantially as herein described.

6. In combination with the generator, the hollow screw-plug, with conical end, as and for the purpose herein described.

7. The drip-valve *b*, for the purpose herein described.

JOHN F. BOYNTON.

Witnesses:
JOS. L. COOMBS,
H. S. MILLER.